United States Patent
Vash et al.

(10) Patent No.: US 9,304,922 B2
(45) Date of Patent: Apr. 5, 2016

(54) INTER-QUEUE ANTI-STARVATION MECHANISM WITH DYNAMIC DEADLOCK AVOIDANCE IN A RETRY BASED PIPELINE

(71) Applicant: Intel Corporation, Sant Clara, CA (US)

(72) Inventors: James R. Vash, Littleton, MA (US);
Bongjin Jung, Westford, MA (US);
Pritpal S. Ahuja, Clinton, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/307,019

(22) Filed: Jun. 17, 2014

(65) Prior Publication Data

US 2014/0297967 A1    Oct. 2, 2014

Related U.S. Application Data

(63) Continuation of application No. 14/142,829, filed on Dec. 28, 2013, now Pat. No. 8,756,349, which is a continuation of application No. 12/978,586, filed on Dec. 26, 2010, now Pat. No. 8,626,968.

(60) Provisional application No. 61/290,202, filed on Dec. 26, 2009.

(51) Int. Cl.
G06F 13/38    (2006.01)
G06F 12/08    (2006.01)
G06F 13/16    (2006.01)
G06F 13/00    (2006.01)

(52) U.S. Cl.
CPC ........ *G06F 12/0815* (2013.01); *G06F 13/1642* (2013.01); *G06F 2212/621* (2013.01)

(58) Field of Classification Search
None
See application file for complete search history.

(56) References Cited

U.S. PATENT DOCUMENTS

2004/0088523 A1     5/2004   Kessler et al.
2004/0133744 A1*    7/2004   Van Doren et al. ........... 711/118

OTHER PUBLICATIONS

Notice of Allowance received for U.S. Appl. No. 12/978,586, mailed on Sep. 12, 2013, 8 pages.
Non-Final Office Action received for U.S. Appl. No. 12/978,586, mailed on Mar. 12, 2013, 7 pages.
Notice of Allowance received for U.S. Appl. No. 14/142,829, mailed on Jan. 30, 2014, 9 pages.

* cited by examiner

*Primary Examiner* — Scott Sun
(74) *Attorney, Agent, or Firm* — Alpine Technology Law Group LLC

(57) ABSTRACT

Methods and apparatus relating to an inter-queue anti-starvation mechanism with dynamic deadlock avoidance in a retry based pipeline are described. In one embodiment, logic may arbitrate between two queues based on various rules. The queues may store data including local or remote requests, data responses, non-data responses, external interrupts, etc. Other embodiments are also disclosed.

21 Claims, 5 Drawing Sheets

INTER-QUEUE ANTI-STARVATION MECHANISM WITH DYNAMIC DEADLOCK AVOIDANCE IN A RETRY BASED PIPELINE

RELATED APPLICATION

The present application is a continuation of U.S. patent application Ser. No. 14/142,829, filed on Dec. 28, 2013, entitled "INTER-QUEUE ANTI-STARVATION MECHANISM WITH DYNAMIC DEADLOCK AVOIDANCE IN A RETRY BASED PIPELINE," now U.S. Pat. No. 8,756,349, which is a continuation of U.S. patent application Ser. No. 12/978,586, filed on Dec. 26, 2010, entitled "INTER-QUEUE ANTI-STARVATION MECHANISM WITH DYNAMIC DEADLOCK AVOIDANCE IN A RETRY BASED PIPELINE," now U.S. Pat. No. 8,626,968, which claims priority to U.S. Provisional Patent Application No. 61/290,202, filed on Dec. 26, 2009, entitled "INTER-QUEUE ANTI-STARVATION MECHANISM WITH DYNAMIC DEADLOCK AVOIDANCE IN A RETRY BASED PIPELINE," which are hereby incorporated herein and for all purposes.

FIELD

The present disclosure generally relates to the field of electronics. More particularly, an embodiment of the invention relates to an inter-queue anti-starvation mechanism with dynamic deadlock avoidance in a retry based pipeline.

BACKGROUND

Generally, a pipeline may include a number of processing elements to service requests. A retry pipeline may allow for retrying of requests that fail to be serviced. In a retry based pipeline, care needs to be taken to ensure that each operation eventually makes tangible forward progress; that is, wins arbitration for the pipeline and is not repeatedly retried due to resource unavailability or conflict.

To guarantee this, it is sometimes necessary to prioritize certain operations over others to ensure that starvation conditions do not persist for any given operation. It is equally important to ensure that this prioritization does not introduce a dependency between two operations that is contrary to those allowed by the parameters of the design (e.g., protocol definition) so as not to introduce a cyclic dependency, and thus, deadlock.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments.

Some embodiments discussed herein provide guaranteed forward progress (anti-starvation) among various queues, which may service local and remote requests and responses, and may arbitrate for shared resources in a retry based pipeline, while dynamically avoiding deadlock, e.g., due to protocol-level dependencies. In one embodiment, one or more entries in a queue may be indicated as "old" at the time the queue enters starvation. This approach is more scalable than some present solutions that rely on a resource intensive table or matrix (sometimes referred to as an Age Order Matrix (AOM)). Also, techniques discussed herein may be applied in any processor where mixed type operations (e.g., local vs. remote, request vs. response) arbitrate for a retry based pipeline, and forward progress guarantees are required while avoiding deadlock in the presence of external protocol-level dependencies.

Figure 1:
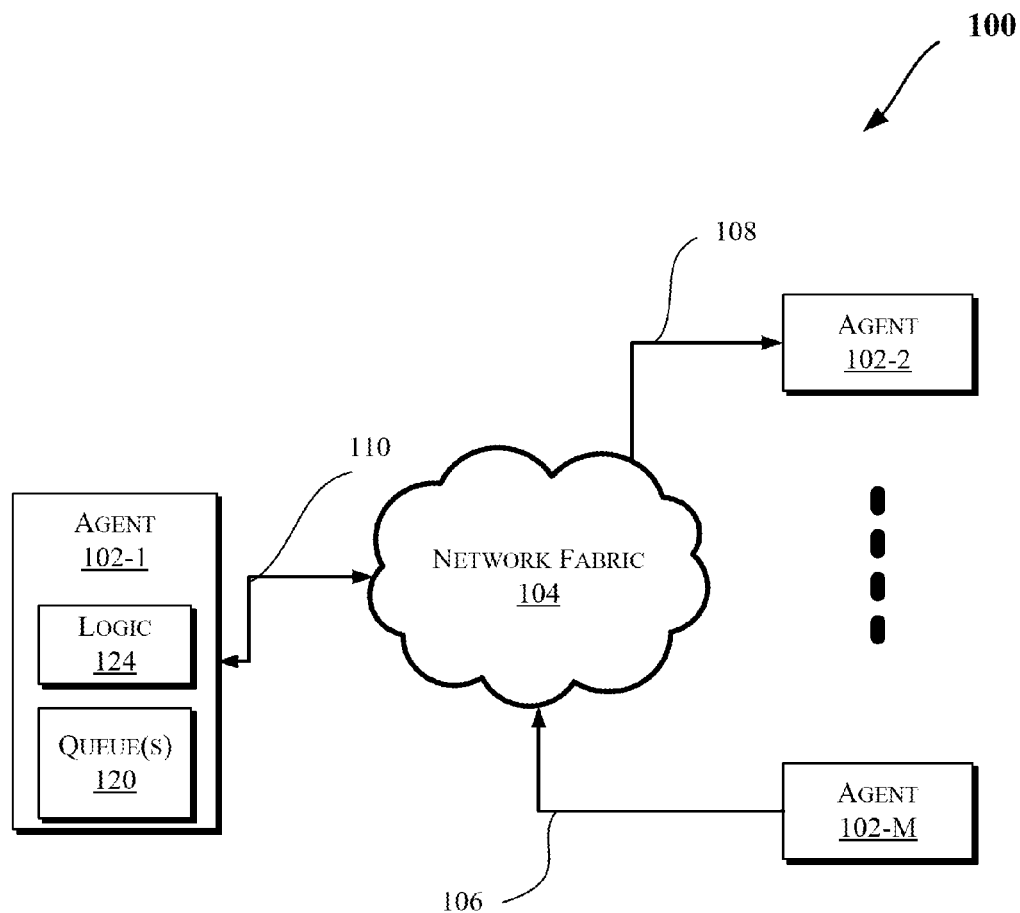
FIGS. 1-2 and 4-5 illustrate block diagrams of embodiments of computing systems, which may be utilized to implement various embodiments discussed herein.

Various computing systems may be used to implement embodiments, discussed herein, such as the systems discussed with reference to FIGS. 1 and 4-5. More particularly, FIG. 1 illustrates a block diagram of a computing system 100, according to an embodiment of the invention. The system 100 may include one or more agents 102-1 through 102-M (collectively referred to herein as "agents 102" or more generally "agent 102"). In an embodiment, one or more of the agents 102 may be any of components of a computing system, such as the computing systems discussed with reference to FIGS. 4-5.

As illustrated in FIG. 1, the agents 102 may communicate via a network fabric 104. In one embodiment, the network fabric 104 may include a computer network that allows various agents (such as computing devices) to communicate data. In an embodiment, the network fabric 104 may include one or more interconnects (or interconnection networks) that communicate via a serial (e.g., point-to-point) link and/or a shared communication network. For example, some embodiments may facilitate component debug or validation on links that allow communication with fully buffered dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers).

In one embodiment, the system 100 may support a layered protocol scheme, which may include a physical layer, a link layer, a routing layer, a transport layer, and/or a protocol layer. The fabric 104 may further facilitate transmission of data (e.g., in form of packets) from one protocol (e.g., caching processor or caching aware memory controller) to another protocol for a point-to-point or shared network. Also, in some embodiments, the network fabric 104 may provide communication that adheres to one or more cache coherent protocols.

Furthermore, as shown by the direction of arrows in FIG. 1, the agents 102 may transmit and/or receive data via the network fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g., via a unidirectional link 108), while some agent(s) (such as agent 102-1) may both transmit and receive data (e.g., via a bidirectional link 110).

Additionally, at least one of the agents 102 may be a home agent and one or more of the agents 102 may be requesting or caching agents as will be further discussed herein. As shown, at least one agent (only one shown for agent 102-1) may have access to one or more queues 120 (which may be register files dedicated to the agent or shared with other agents) to store one or more transactions. Also, agent 102-1 may include logic 124 to maintain information about entries in the entries in the queues 120 to avoid starvation in some embodiments. In an embodiment, the queue(s) 120 are provided on the same integrated circuit (IC) chip as a caching agent.

Figure 2:
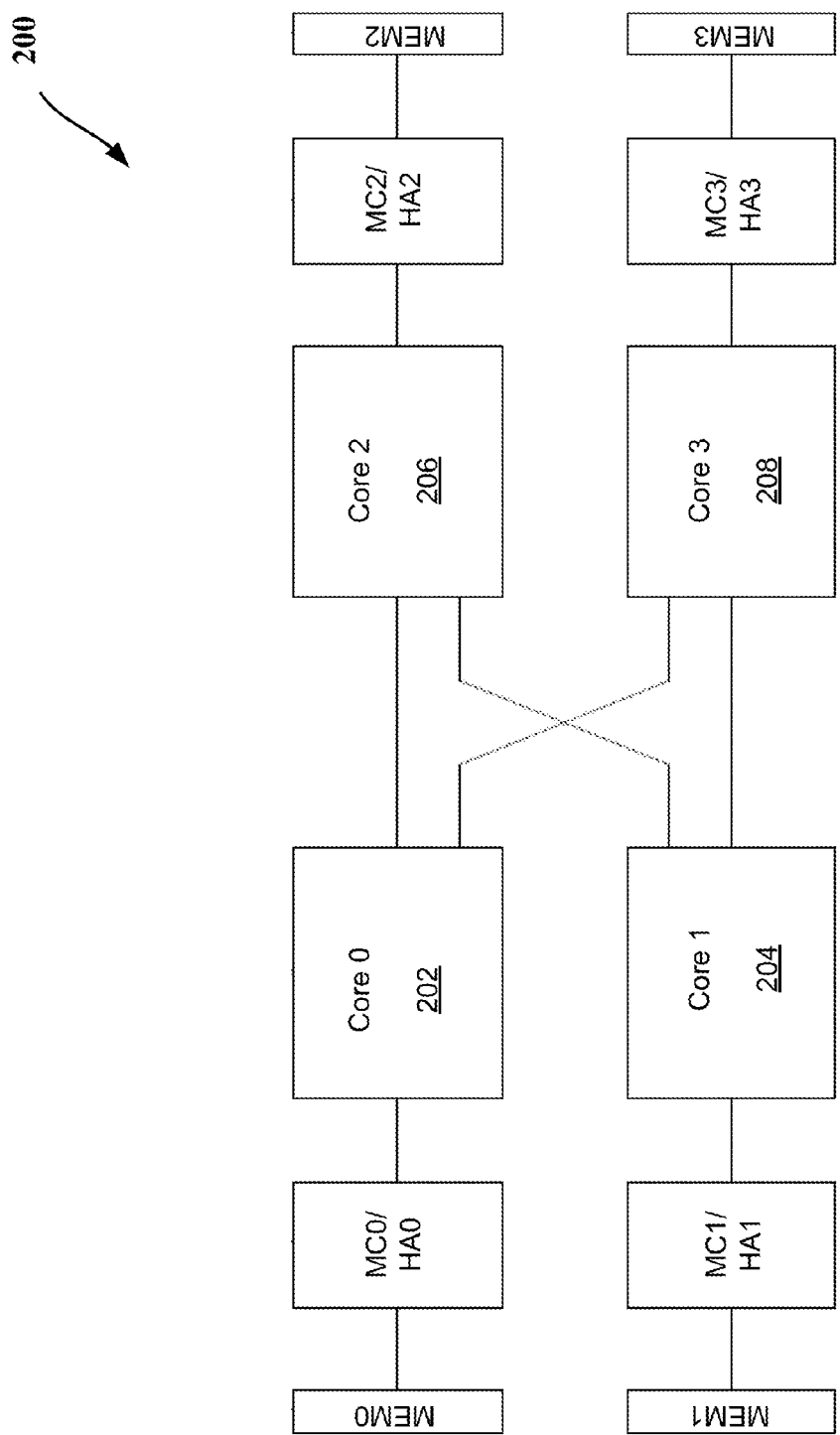

FIG. 2 is a block diagram of a computing system in accordance with an embodiment. System 200 may include a plurality of sockets 202-208 (four shown but some embodiments may have more or less socket). Each socket may include a processor in an embodiment. Also, each socket may be coupled to the other sockets via point-to-point (PtP) link such as discussed with reference FIG. 5. As discussed with respect to FIG. 1 with reference to the network fabric 104, each socket may be coupled to a local portion of system memory, e.g., formed of a plurality of Dual Inline Memory Modules (DIMMs) that may include dynamic random access memory (DRAM).

As shown in FIG. 2, each socket may be coupled to a memory controller (MC)/Home Agent (HA) (such as MC0/HA0 through MC3/HA3). The memory controllers may be coupled to a corresponding local memory (labeled as MEM0 through MEM3), which may be a portion of system memory (such as memory 512 of FIG. 5). In some embodiments, the memory controller (MC)/Home Agent (HA) (such as MC0/HA0 through MC3/HA3) may be the same or similar to agent 102-1 of FIG. 1 and the memory, labeled as MEM0 through MEM3. Also, one or more components of system 200 may be included on the same integrated circuit die in some embodiments. An implementation such as shown in FIG. 2 thus may be for a socket glueless configuration with mirroring. For example, data assigned to a memory controller (such as MC0/HA0) may be mirrored to another memory controller (such as MC3/HA3) over the PtP links.

Some interconnect protocols (such as the Intel® QPI (Quick Path Interconnect) protocol) may have six protocol channels: HOM (coherent requests and snoop responses), SNP (coherent snoop requests), NCB (non-coherent posted requests), NCS (non-coherent non-posted requests), DRS (data responses), and NDR (non-data responses). Of these, three (HOM, DRS, and NDR) are effectively pre-allocated, and so their forward progress is not dependent on other channels. The others have the following dependencies on other channels for forward progress as follows: (1) SNP→{HOM, DRS, NDR}; (2) NCB→{DRS, NDR}; and (3) NCS→{HOM, SNP, NCB, DRS, NDR}. Each message in a channel may also have a dependency on the forward progress of other messages in the same channel in the interconnection network, but the network is free of cycles (including through protocol agents).

Furthermore, some interconnect caching agents may have a retry based pipeline, with several queues that arbitrate for the pipeline and shared resources, such as: (1) IRQ: Local requests (e.g., local to corresponding agent); (2) IPQ: External/remote snoop requests (QPI SNP channel, e.g., from a different agent); (3) VIQ: LLC (last-level cache) victims; (4) IDQ: Data responses from local/remote agents (QPI DRS channel); (5) ICQ: Non-data responses from remote agents (QPI NDR channel); (6) SRQ: Non-data responses from local agents; (7) IMQ: External interrupts (QPI NCB channel).

The caching agent may follow a victimize-on-miss policy. VIQ entries are created by LLC misses from IRQ, or IPQ in the case of DCA (direct cache access) prefetches (a.k.a. Prefetch Hint). The equivalent of the QPI ORB (outgoing request buffer) in the caching agent is the MAF (miss address file). A MAF entry may be allocated by IRQ, IPQ, or VIQ. IMQ does not allocate a MAF entry. One particular MAF entry may be allocated only by IPQ (excluding Prefetch Hint); another particular MAF entry may be allocated only by IPQ (excluding Prefetch Hint) or VIQ; other MAF entries can be allocated by IRQ (or Prefetch Hint) as well.

In some implementations, an intra-queue anti-starvation mechanism for each of these queues (except IMQ) may be present which may function as follows. When a particular queue enters starvation, certain entries are designated as "old". The queue may not leave starvation until all "old" entries have drained. For IRQ and IPQ only, during starvation, only "old" entries are allowed to arbitrate. IMQ has only one entry, and does not have this intra-queue anti-starvation mechanism. Moreover, IMQ is special in that it may not participate in the normal round-robin arbitration for the pipeline with the other queues. Instead, when it is valid, by default it will take priority over the other queues, unless it is blocked according to the anti-starvation rules as further discussed below.

Some embodiments provide descriptions for the inter-queue blocking rules required to guarantee forward progress of each queue in a retry based pipeline, with special consideration for dynamic deadlock avoidance.

Some of the terms discussed herein are defined as follows:

1. SNP/NCB/NCS credits available. Detects whether the aforementioned protocol channels which are not pre-allocated have credits available for use by the caching agent. Certain queues may not be blocked when these credits are unavailable, as forward progress of those protocol channels may be directly or indirectly dependent on the progress of those queues.

2. MAF "IRQ empty". Tracks whether the MAF contains any entries which were allocated by the IRQ. Certain queues may not be blocked when these entries exist, since the deallocation of these entries may be directly or indirectly dependent on the progress of those queues. Note that a MAF entry allocated by Prefetch Hint is considered part of this term.

3. MAF "VIQ empty". Similar to MAF "IRQ empty", except that it tracks whether the MAF contains any entries which were allocated by the VIQ.

Figure 3:
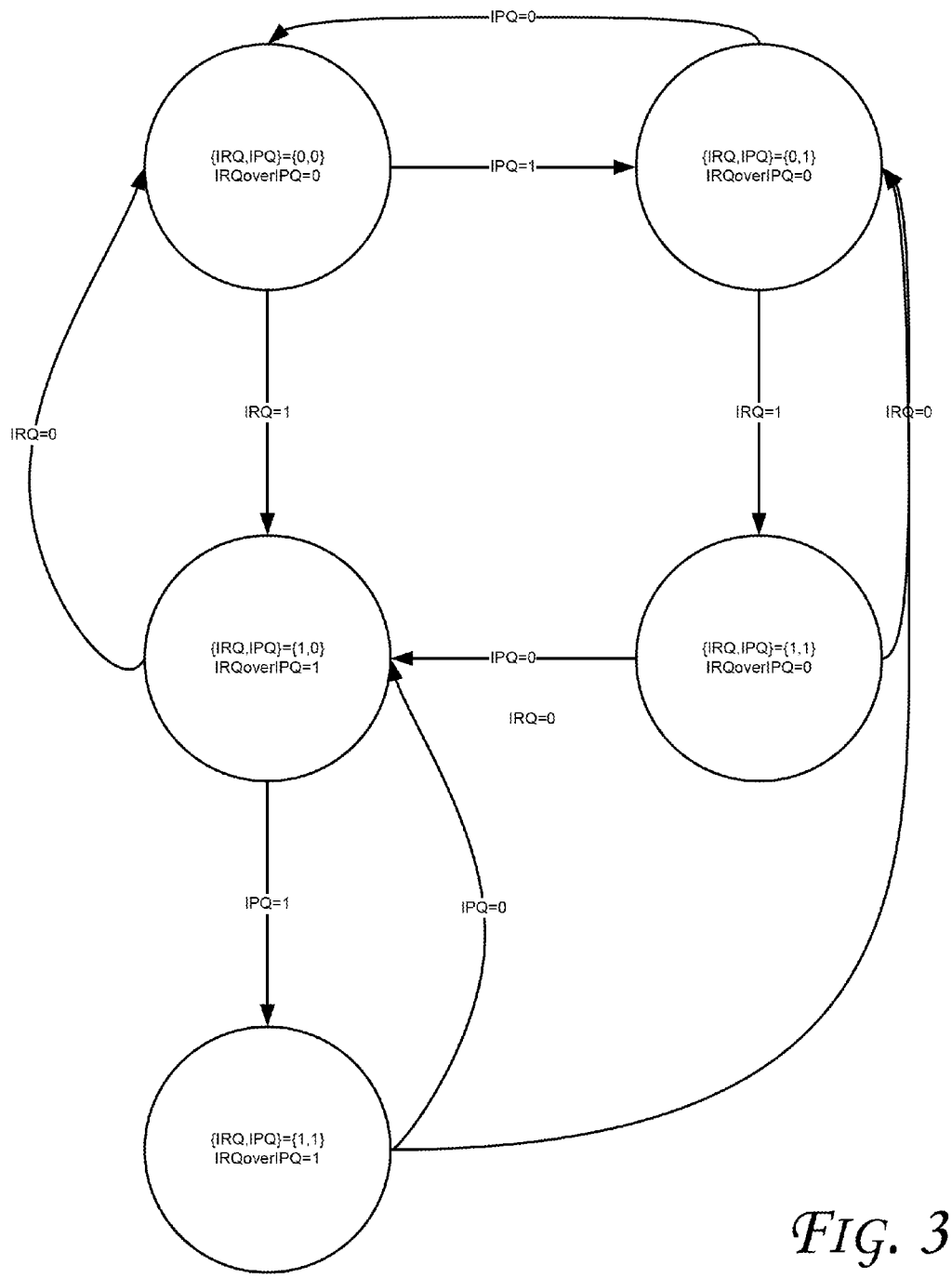
FIG. 3 illustrates a state machine diagram according to some embodiments.

4. "IRQ over IPQ". Determines whether the local requests or external snoop requests have priority when both of the associated queues are starving. It is true when IPQ has left starving state since IRQ started starving (or was not starving when IRQ started starving). The corresponding state machine is illustrated in FIG. 3. This provides an alternating priority between IRQ and IPQ.

5. "IRQ over IMQ". Similar to "IRQ over IPQ". It is true when IMQ has become invalid since IRQ started starving (or was not valid when IRQ started starving). It provides an alternating priority between IRQ and IMQ.

6. "IPQ over IMQ". Similar to "IRQ over IPQ". It is true when IMQ has become invalid since IRQ started starving (or was not valid when IRQ started starving). It provides an alternating priority between IPQ and IMQ.

Table 1 below shows the queue blocking rules according to some embodiments. If an "x" is marked in a cell, it means that the row may block the column. Notes of explanation follow the table.

TABLE 1

|     | IRQ    | IPQ    | VIQ   | IDQ   | ICQ   | SRQ   | IMQ     |
|-----|--------|--------|-------|-------|-------|-------|---------|
| IRQ |        | x (*2) |       |       |       |       | x (*9)  |
| IPQ | x (*1) |        |       |       |       |       | x (*10) |
| VIQ | x (*0) | x (*3) |       |       |       |       | x (*11) |
| IDQ | x (*0) | x (*4) |       |       |       |       | x (*12) |
| ICQ | x (*0) | x (*4) |       |       |       |       | x (*12) |
| SRQ | x (*0) | x (*4) |       |       |       |       | x (*12) |
| IMQ | x (*5) | x (*6) | x (*7)| x (*8)| x (*8)| x (*8)|         |

Where:
(*0) VIQ/IDQ/ICQ/SRQ may unconditionally block IRQ.
(*1) IPQ may block IRQ unless conditions in (*2) are satisfied.
(*2) IRQ may block IPQ if MAF is "IRQ empty" and "VIQ empty", and SNP/NCB/NCS credits are available, and "IRQ over IPQ" is true.
(*3) VIQ may block IPQ if SNP/NCB/NCS credits are available and MAF is "VIQ empty".
(*4) IDQ/ICQ/SRQ may block IPQ if SNP/NCB/NCS credits are available.
(*5) IMQ may block IRQ unless conditions in (*9) are satisfied.
(*6) IMQ may block IPQ unless conditions in (*10) are satisfied.
(*7) IMQ may block VIQ unless conditions in (*11) are satisfied.
(*8) IMQ may block IDQ/ICQ/SRQ unless conditions in (*12) are satisfied.
(*9) IRQ may block IMQ if MAF is "IRQ empty" and "VIQ empty", and SNP/NCB/NCS credits are available, and "IRQ over IMQ" is true.
(*10) IPQ may block IMQ if SNP/NCB/NCS credits are available, and "IPQ over IMQ" is true.
(*11) VIQ may block IMQ if SNP/NCB/NCS credits are available, and MAF is "VIQ empty".
(*12) IDQ/ICQ/SRQ may block IMQ if SNP/NCB/NCS credits are available.

In accordance with some embodiments, there are several points to be made with respect to these blocking rules.

1. Conditioning any queue blocking of IPQ/IMQ with SNP/NCB/NCS credits available is necessary, since IPQ/IMQ may be required to make progress in order for those credits to become available. Temporarily avoiding this blocking does not lead to starvation since IPQ/IMQ may not make this condition persist (i.e., do not acquire these credits).

2. Conditioning IRQ blocking of IPQ/IMQ with the MAF being "IRQ empty" is necessary, since MAF entries allocated by IRQ may be holding resources that require system SNP/NCB/NCS progress to be released. Temporarily avoiding this blocking does not lead to starvation since IPQ/IMQ may not make this condition persist (i.e., may not allocate a MAF entry which is considered allocated by IRQ). Note that Prefetch Hint is not allowed to allocate a MAF entry while IRQ is starving in order to maintain this invariant.

3. Conditioning IRQ/VIQ blocking of IPQ/IMQ with the MAF being "VIQ empty" is necessary, since MAF entries allocated by VIQ may be holding resources that require system SNP/NCB/NCS progress to be released. This is only true in the presence of non-coherent victims. Temporarily avoiding this blocking does not lead to starvation since IPQ/IMQ may not make this condition persist (i.e., may not allocate a MAF entry which is considered allocated by VIQ). Note that Prefetch Hint is not allowed to allocate a MAF entry while VIQ is starving in order to maintain this invariant.

4. Note that queues (VIQ, IDQ, ICQ, SRQ) which may only have entries as a side effect of new requests from other queues (IRQ, IPQ, IMQ), may freely allow all entries (not just "old") to bid during starvation. Only IRQ and IPQ (not IMQ since it is single-entry) requires that only "old" entries bid during starvation. However, other queues also drain all "old" entries before leaving starvation.

5. For similar reasons, it is not in general necessary to block these queues (VIQ, IDQ, ICQ, SRQ), as blocking queues that generate new requests is sufficient to drain them.

Aside from these rules, several other pipeline rejection conditions may be avoided in order to avoid deadlock due to queue blocking for anti-starvation in some embodiments:

(1) Prevent blocking IPQ due to address match with outstanding transaction in a state which requires SNP/NCB/NCS credits to make progress. In some cases, this requires pre-allocation of these credits by the caching agent before moving to a state which would block IPQ.

(2) Prevent blocking VIQ due to address match with outstanding transaction in a state which requires SNP/NCB/NCS credits to make progress. In some cases, this requires preventing victim generation during certain states of transactions to the same LLC index.

Moreover, the GQ (global queue) based caching agent implementation in some computing systems may implement a PSS (Pool Starvation Snapshot) mechanism to guarantee forward progress. This mechanism may require an AOM (Age Order Matrix) among entries within a queue to guarantee progress for the oldest entry, as well as resource reservation mechanisms. In contrast, at least some embodiments discussed herein do not require any age-based information, other than designating which entries within a queue are "old" at the time the queue enters starvation. In an embodiment, such an approach only utilizes one state bit per entry, a two-bit state per queue, and a valid bit plus entry number to track a "canary" entry within each queue. As a result, such an approach is more scalable than an age order matrix, which grows as $N^2$ with the number of entries in a queue. Additionally, at least one embodiment does not require any resource reservation mechanisms to guarantee forward progress. This in turn reduces complexity and allows resources to be used freely (excepting static reservations such as MAF entries for IPQ/VIQ) by any operation which is able to arbitrate for the pipeline Additionally, in the presence of non-coherent victims (LLC victims which generate NCB/NCS writes), there is a potential deadlock with the aforementioned blocking conditions, in the current implementation. Because IDQ/ICQ responses for MAF entries allocated by IRQ may starve waiting for the progress of victims, and IDQ/ICQ may block IPQ/IMQ, it is possible to deadlock since in-flight non-coherent victims may require SNP/NCB/NCS progress, which in turn may require IPQ/IMQ progress.

A solution which addresses this issue may maintain a bit-vector of MAF entries occupied by non-coherent victims. A bit may be set when a non-coherent victim is sent for the corresponding MAF entry, and cleared when the completion response from ICQ passes through (but is not necessarily accepted by) the pipeline. When this vector is non-zero, IDQ/ICQ may be disallowed from blocking IPQ/IMQ. Temporarily avoiding this blocking may not lead to starvation because IPQ/IMQ may not make this condition cannot persist (i.e. do not create non-coherent victims). However, since non-coherent victims may be detected as an error, this potential deadlock is generally not a concern in practice.

FIG. 3 illustrates a state machine diagram in accordance with an embodiment. More particularly, the state machine illustrates the conditions described above for the definition of the term "IRQ over IPQ". As shown in FIG. 3, the state machine has two inputs, "IRQ" and "IPQ", which indicate whether the corresponding queue is starving. It provides an output "IRQ over IPQ" which is true when IPQ has left starving state since IRQ started starving (or was not starving when IRQ started starving).

Figure 4:
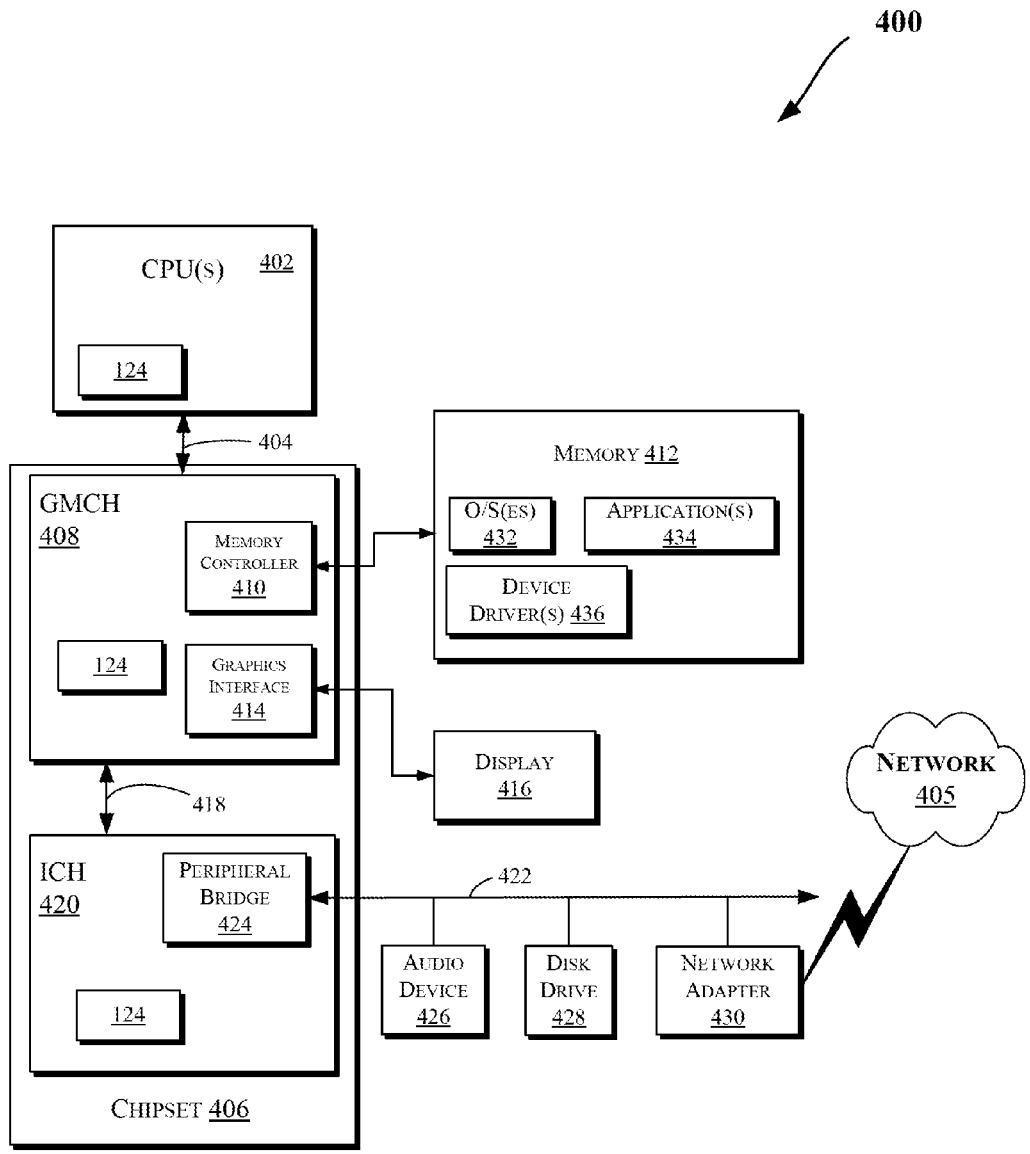

FIG. 4 illustrates a block diagram of an embodiment of a computing system 400. One or more of the agents 102 of FIG. 1 may comprise one or more components of the computing system 400. Also, one or more components of FIG. 4 may include logic 124 of FIG. 1. Also, logic 124 may be present in components other than those shown. The computing system 400 may include one or more central processing unit(s) (CPUs) 402 (which may be collectively referred to herein as "processors 402" or more generically "processor 402")

coupled to an interconnection network (or bus) 404. The processors 402 may be any type of processor such as a general purpose processor, a network processor (which may process data communicated over a computer network 405), etc. (including a reduced instruction set computer (RISC) processor or a complex instruction set computer (CISC)). Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors.

The processor 402 may include one or more caches which may be private and/or shared in various embodiments. Generally, a cache stores data corresponding to original data stored elsewhere or computed earlier. To reduce memory access latency, once data is stored in a cache, future use may be made by accessing a cached copy rather than refetching or recomputing the original data. The cache(s) may be any type of cache, such a level 1 (L1) cache, a level 2 (L2) cache, a level 3 (L3), a mid-level cache, a last level cache (LLC), etc. to store electronic data (e.g., including instructions) that is utilized by one or more components of the system 400. Additionally, such cache(s) may be located in various locations (e.g., inside other components to the computing systems discussed herein.

A chipset 406 may additionally be coupled to the interconnection network 404. Further, the chipset 406 may include a graphics memory control hub (GMCH) 408. The GMCH 408 may include a memory controller 410 that is coupled to a memory 412. The memory 412 may store data, e.g., including sequences of instructions that are executed by the processor 402, or any other device in communication with components of the computing system 400. Also, in one embodiment of the invention, the memory 412 may include one or more volatile storage (or memory) devices such as random access memory (RAM), dynamic RAM (DRAM), synchronous DRAM (SDRAM), static RAM (SRAM), etc. Nonvolatile memory may also be utilized such as a hard disk. Additional devices may be coupled to the interconnection network 404, such as multiple processors and/or multiple system memories.

The GMCH 408 may further include a graphics interface 414 coupled to a display device 416 (e.g., via a graphics accelerator in an embodiment). In one embodiment, the graphics interface 414 may be coupled to the display device 416 via an accelerated graphics port (AGP). In an embodiment of the invention, the display device 416 (such as a flat panel display) may be coupled to the graphics interface 414 through, for example, a signal converter that translates a digital representation of an image stored in a storage device such as video memory or system memory (e.g., memory 412) into display signals that are interpreted and displayed by the display 416.

As shown in FIG. 4, a hub interface 418 may couple the GMCH 408 to an input/output control hub (ICH) 420. The ICH 420 may provide an interface to input/output (I/O) devices coupled to the computing system 400. The ICH 420 may be coupled to a bus 422 through a peripheral bridge (or controller) 424, such as a peripheral component interconnect (PCI) bridge that may be compliant with the PCIe specification, a universal serial bus (USB) controller, etc. The bridge 424 may provide a data path between the processor 402 and peripheral devices. Other types of topologies may be utilized. Also, multiple buses may be coupled to the ICH 420, e.g., through multiple bridges or controllers. Further, the bus 422 may comprise other types and configurations of bus systems. Moreover, other peripherals coupled to the ICH 420 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), etc.

The bus 422 may be coupled to an audio device 426, one or more disk drive(s) 428, and a network adapter 430 (which may be a NIC in an embodiment). In one embodiment, the network adapter 430 or other devices coupled to the bus 422 may communicate with the chipset 406. Also, various components (such as the network adapter 430) may be coupled to the GMCH 408 in some embodiments of the invention. In addition, the processor 402 and the GMCH 408 may be combined to form a single chip. In an embodiment, the memory controller 410 may be provided in one or more of the CPUs 402. Further, in an embodiment, GMCH 408 and ICH 420 may be combined into a Peripheral Control Hub (PCH).

Additionally, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media capable of storing electronic data (e.g., including instructions).

The memory 412 may include one or more of the following in an embodiment: an operating system (O/S) 432, application 434, and/or device driver 436. The memory 412 may also include regions dedicated to Memory Mapped I/O (MMIO) operations. Programs and/or data stored in the memory 412 may be swapped into the disk drive 428 as part of memory management operations. The application(s) 434 may execute (e.g., on the processor(s) 402) to communicate one or more packets with one or more computing devices coupled to the network 405. In an embodiment, a packet may be a sequence of one or more symbols and/or values that may be encoded by one or more electrical signals transmitted from at least one sender to at least on receiver (e.g., over a network such as the network 405). For example, each packet may have a header that includes various information which may be utilized in routing and/or processing the packet, such as a source address, a destination address, packet type, etc. Each packet may also have a payload that includes the raw data (or content) the packet is transferring between various computing devices over a computer network (such as the network 405).

In an embodiment, the application 434 may utilize the O/S 432 to communicate with various components of the system 400, e.g., through the device driver 436. Hence, the device driver 436 may include network adapter 430 specific commands to provide a communication interface between the O/S 432 and the network adapter 430, or other I/O devices coupled to the system 400, e.g., via the chipset 406.

In an embodiment, the O/S 432 may include a network protocol stack. A protocol stack generally refers to a set of procedures or programs that may be executed to process packets sent over a network 405, where the packets may conform to a specified protocol. For example, TCP/IP (Transport Control Protocol/Internet Protocol) packets may be processed using a TCP/IP stack. The device driver 436 may indicate the buffers in the memory 412 that are to be processed, e.g., via the protocol stack.

The network 405 may include any type of computer network. The network adapter 430 may further include a direct memory access (DMA) engine, which writes packets to buffers (e.g., stored in the memory 412) assigned to available descriptors (e.g., stored in the memory 412) to transmit and/or receive data over the network 405. Additionally, the network adapter 430 may include a network adapter controller, which may include logic (such as one or more programmable processors) to perform adapter related operations. In an embodiment, the adapter controller may be a MAC (media access control) component. The network adapter 430 may further include a memory, such as any type of volatile/nonvolatile memory (e.g., including one or more cache(s) and/or other memory types discussed with reference to memory 412).

Figure 5:
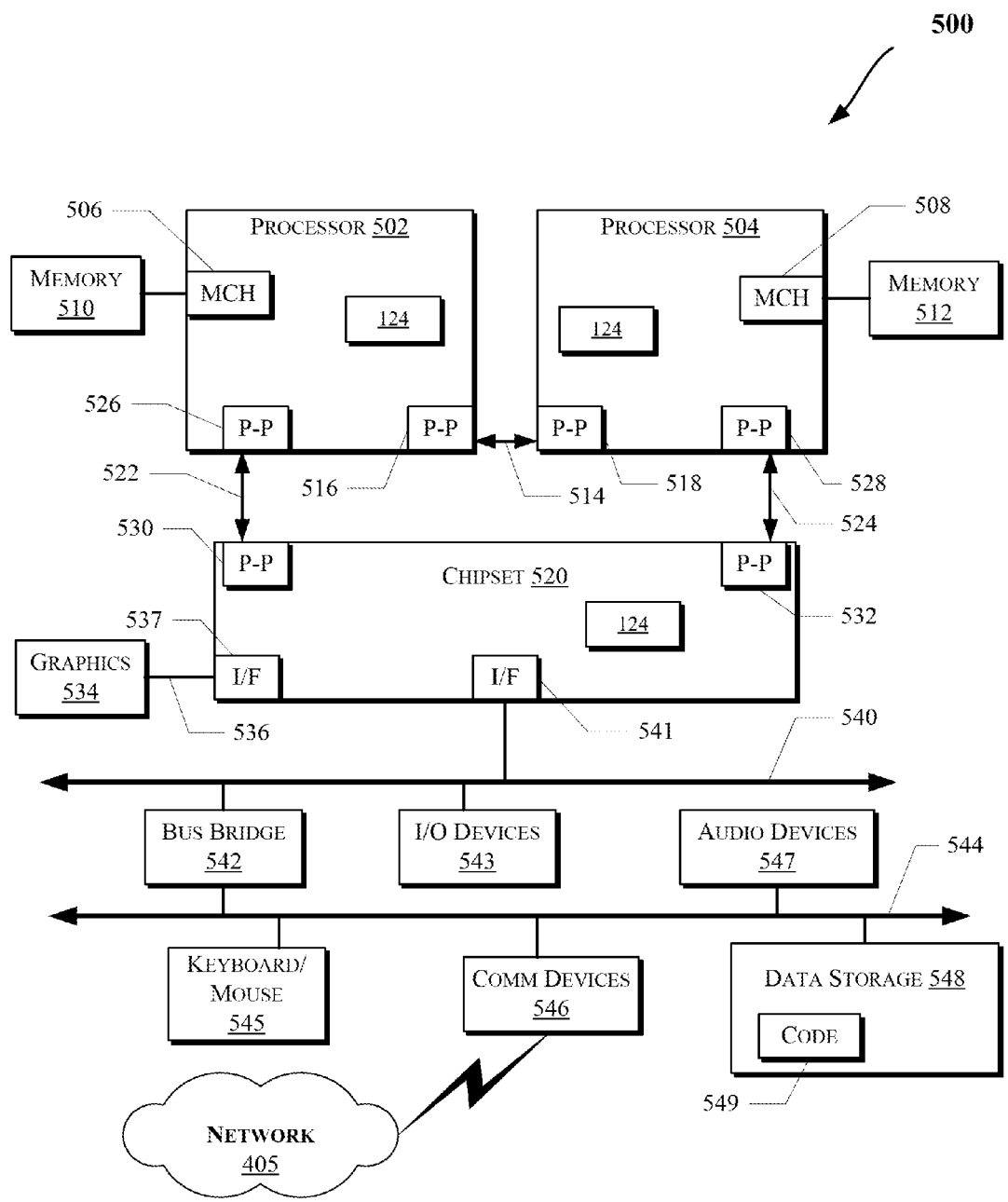

FIG. 5 illustrates a computing system 500 that is arranged in a point-to-point (PtP) configuration, according to an embodiment of the invention. In particular, FIG. 5 shows a system where processors, memory, and input/output devices are interconnected by a number of point-to-point interfaces. The operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller hub (GMCH) 506 and 508 to enable communication with memories 510 and 512. The memories 510 and/or 512 may store various data such as those discussed with reference to the memory 512 of FIG. 5. As shown in FIG. 5, the processors 502 and 504 (or other components of system 500 such as chipset 520, I/O devices 543, etc.) may also include one or more cache(s) such as those discussed with reference to FIGS. 1-4.

In an embodiment, the processors 502 and 504 may be one of the processors 502 discussed with reference to FIG. 5. The processors 502 and 504 may exchange data via a point-to-point (PtP) interface 514 using PtP interface circuits 516 and 518, respectively. Also, the processors 502 and 504 may each exchange data with a chipset 520 via individual PtP interfaces 522 and 524 using point-to-point interface circuits 526, 528, 530, and 532. The chipset 520 may further exchange data with a high-performance graphics circuit 534 via a high-performance graphics interface 536, e.g., using a PtP interface circuit 537.

In at least one embodiment, logic 124 may be provided in one or more of the processors 502, 504 and/or chipset 520. Other embodiments of the invention, however, may exist in other circuits, logic units, or devices within the system 500 of FIG. 5. Furthermore, other embodiments of the invention may be distributed throughout several circuits, logic units, or devices illustrated in FIG. 5. However, logic 124 may be provided in locations throughout the system 500, including or excluding those illustrated.

The chipset 520 may communicate with the bus 540 using a PtP interface circuit 541. The bus 540 may have one or more devices that communicate with it, such as a bus bridge 542 and I/O devices 543. Via a bus 544, the bus bridge 542 may communicate with other devices such as a keyboard/mouse 545, communication devices 546 (such as modems, network interface devices, or other communication devices that may communicate with the computer network 505), audio I/O device, and/or a data storage device 548. The data storage device 548 may store code 549 that may be executed by the processors 502 and/or 504.

In various embodiments of the invention, the operations discussed herein, e.g., with reference to FIGS. 1-5, may be implemented as hardware (e.g., circuitry), software, firmware, microcode, or combinations thereof, which may be provided as a computer program product, e.g., including a machine-readable or computer-readable (e.g., non-transitory) medium having stored thereon instructions (or software procedures) used to program a computer to perform a process discussed herein. Also, the term "logic" may include, by way of example, software, hardware, or combinations of software and hardware. The machine-readable medium may include a storage device such as those discussed herein. Additionally, such computer-readable media may be downloaded as a computer program product, wherein the program may be transferred from a remote computer (e.g., a server) to a requesting computer (e.g., a client) through data signals provided via a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   logic to block a remote snoop request in response to a local request and absence of an entry, corresponding to a local request and a last level cache victim, in a miss address file.

2. The apparatus of claim 1, wherein the logic is to block the remote snoop request in response to availability of one or more credits for one or more coherent snoop requests, one or more non-coherent posted requests, and one more non-coherent non-posted requests.

3. The apparatus of claim 1, wherein the logic is to block the remote snoop request in response to a first queue, storing one or more remote snoop requests, having left a starving state since a second queue, storing one or more local requests, started starving.

4. The apparatus of claim 1, comprising logic to block the local request in response the remote snoop request unless an entry, corresponding to the local request and the last level cache victim, is absent from the miss address file and the availability of the one or more credits for the one or more coherent snoop requests, the one or more non-coherent posted requests, and the one more non-coherent non-posted requests.

5. The apparatus of claim 4, wherein the logic to block the local request is to block the local request in response to a first queue, storing one or more remote snoop requests, having left a starving state since a second queue, storing one or more local requests, started starving.

6. The apparatus of claim 1, comprising logic to block the local request in response to one or more of: the last level cache victim, a data response from local agents or remote agents, a non-data response from the remote agents, or a non-data response from the local agents.

7. The apparatus of claim 1, wherein no age-based information is to be used to guarantee forward progress in a queue that stores one or more of the remote snoop request or the local request, other than designating which entries within the queue are old at the time the queue enters starvation.

8. The apparatus of claim 1, further comprising a retry based pipeline coupled to the logic to service requests.

9. The apparatus of claim 1, further comprising a first agent to generate the local request and a second agent to generate the remote request.

10. The apparatus of claim 9, further comprising a serial link to couple the first agent and second agent.

11. The apparatus of claim 9, wherein the first agent and second agent are on a same integrated circuit die.

12. An apparatus comprising:
   logic to block a local request in response to one or more of: a last level cache victim, a data response from local agents or remote agents, a non-data response from the remote agents, or a non-data response from the local agents; and
   a retry based pipeline coupled to the logic to service requests.

13. The apparatus of claim 12, comprising logic to block a remote snoop request in response to the local request and absence of an entry, corresponding to a local request and a last level cache victim, in a miss address file.

14. The apparatus of claim 13, wherein the logic to block the remote snoop request is to block the remote snoop request in response to availability of one or more credits for one or more coherent snoop requests, one or more non-coherent posted requests, and one more non-coherent non-posted requests.

15. The apparatus of claim 13, wherein the logic to block the remote snoop request is to block the remote snoop request in response to a first queue, storing one or more remote snoop requests, having left a starving state since a second queue, storing one or more local requests, started starving.

16. The apparatus of claim 14, wherein the logic is to block the local request in response the remote snoop request unless an entry, corresponding to the local request and the last level cache victim, is absent from the miss address file and the availability of the one or more credits for the one or more coherent snoop requests, the one or more non-coherent posted requests, and the one more non-coherent non-posted requests.

17. The apparatus of claim 12, wherein no age-based information is to be used to guarantee forward progress in a queue that stores one or more of a remote snoop request or the local request, other than designating which entries within the queue are old at the time the queue enters starvation.

18. The apparatus of claim 12, wherein a first agent is to generate the local request and a second agent is to generate the remote request, wherein a serial link is to couple the first agent and second agent.

19. The apparatus of claim 18, wherein the first agent and the second agent are on a same integrated circuit die.

20. The apparatus of claim 1, further comprising memory to store data corresponding to the local request or the remote snoop request.

21. The apparatus of claim 12, further comprising memory to store data corresponding to the local request.

* * * * *